United States Patent [19]

Mirabeau et al.

[11] Patent Number: 5,114,756
[45] Date of Patent: May 19, 1992

[54] CONDUCTIVE EPOXYPOLYAMIDE COATING COMPOSITION

[75] Inventors: Mary N. Mirabeau, Glen Mills, Pa.; Frank Rohrbacher, Wilmington, Del.

[73] Assignee: E. I. Du Pont de Nemours and Company, Wilmington, Del.

[21] Appl. No.: 698,271

[22] Filed: May 10, 1991

Related U.S. Application Data

[62] Division of Ser. No. 515,401, Apr. 27, 1990, Pat. No. 5,051,209.

[51] Int. Cl.⁵ ............................................. B05D 3/02
[52] U.S. Cl. .................................... 427/379; 427/410; 427/412.3; 427/412.5; 428/414; 428/416; 428/448
[58] Field of Search ............. 427/13, 204, 205, 407.1, 427/419.7, 419.2, 409, 410, 412.3, 412.5, 379

[56] References Cited

U.S. PATENT DOCUMENTS

| | | | |
|---|---|---|---|
| 3,998,716 | 12/1976 | Masar et al. | 427/13 |
| 4,146,657 | 3/1979 | Gordon | 427/109 |
| 4,546,046 | 10/1985 | Etzell et al. | 427/407.1 |
| 4,594,182 | 6/1986 | Hashimoto et al. | 106/1.22 |
| 4,619,704 | 10/1986 | Hashimoto et al. | 106/286.4 |
| 4,755,418 | 7/1988 | DebRoy et al. | 427/410 |
| 4,950,507 | 8/1990 | Miyazaki et al. | 427/407.1 |
| 5,051,209 | 9/1991 | Mirabeau et al. | 524/492 |
| 5,068,063 | 11/1991 | Tremper | 252/518 |

*Primary Examiner*—Michael Lusignan
*Assistant Examiner*—Diana L. Dudash
*Attorney, Agent, or Firm*—Hilmar L. Fricke

[57] ABSTRACT

A conductive coating composition containing a binder and pigment in a pigment to binder weight ratio of about 15:100 to 100:100; wherein the binder contains
(A) a multifunctional amine, a polyamide resin, polyamidoamine resin or any mixtures thereof; and
(B) a multifunctional epoxy resin;

wherein the electrically conductive pigment is a silica which is either amorphous silica, a silica containing material or a silica coated pigment, the silica is in association with a two-dimensional network of antimony-containing tin oxide crystallites in which the antimony content ranges from about 1–30% by weight of the tin oxide and the composition forms a coating on a substrate that has a surface conductivity of at least 100 Ransburg units. The coating can be used on metal or plastic substrates or previously coated substrates of either plastic or metal to render the substrate conductive and easily grounded for electrostatic spraying.

15 Claims, No Drawings

CONDUCTIVE EPOXYPOLYAMIDE COATING COMPOSITION

This is a division of application Ser. No. 07/515,401, filed Apr. 27, 1990, now U.S. Pat. No. 5,051,209.

BACKGROUND OF THE INVENTION

This invention is related to an electrically conductive coating and in particular an electrically conductive coating that does not contain carbon black pigment.

Primers and conductive primers are well known in the art and are used in the manufacture of automobiles and trucks. Tremper U.S. Pat. No. 4,470,426, issued Apr. 26, 1988 shows a conductive primer composition. Also, conductive guide coats or primer surfacers used over plastic parts are known and are shown in Tremper U.S. Pat. No. 4,470,566, issued on Apr. 26, 1988.

In modern auto and truck manufacturing facilities, the topcoat of paint is applied by electrostatic spraying which reduces paint losses and air pollution caused by paint over-spraying. Electrostatic spraying substantially reduces over-spraying since the electrostatic charge on the atomized paint particles results in most of the paint being deposited on the substrate. However, to efficiently electrostatically spray paint, the substrate must be electrically conductive and the substrate must be grounded. After a primer has been applied by either spraying, dipping, or electrocoating to a steel metal autobody substrate such as a fender, door, or hood, the metal part is insulated by the primer making it difficult to ground or if the substrate is plastic the substrate is not electrically conductive and cannot be grounded. The aforementioned conductive primers, guide coats or primer surfacers can be applied to achieve the necessary level of conductivity to make the substrate conductive and allow the substrate to be grounded for effective electrostatic spraying. However, to achieve the needed level of conductivity, a conductive carbon black pigment or black iron oxide is used which gives the composition a dark color which requires the use of a thicker layer of topcoat to cover the darker color of the primer, guide coat or primer surfacer. There is a need to eliminate the black pigment and replace it with a conductive pigment system which would eliminate the color problem and allow for the use of normal topcoat thickness of paint. The use of less paint would reduce manufacturing cost and reduce air pollution problems.

SUMMARY OF THE INVENTION

A conductive coating composition having pigment in a pigment to binder weight ratio of about 15:100 to 100:100; wherein the binder contains (A) a multifunctional amine, a polyamide, polyamido amine resin or any mixtures thereof; and (B) a multifunctional epoxy resin; wherein the pigment comprises an electrically conductive pigment of silica which is either amorphous silica, a silica containing material or a silica coated pigment, the silica is in association with a two-dimensional network of antimony-containing tin oxide crystallites in which the antimony content ranges from about 1–30% by weight of the tin oxide and the composition forms a coating having a surface conductivity of at least 100 Ransburg units. The coating composition can be used on plastic or metal substrates or previously coated substrates of either plastic or metal to render the substrate conductive and easily grounded for electrostatic spraying.

DETAILED DESCRIPTION OF THE INVENTION

The conductive coating composition of this invention can be used as a primer, a primer surfacer, a guide coat over plastics such as polyester reinforced fiberglass, reaction injection molded urethanes, partially crystalline polyamides, polyarylates and the like, metals such as cold roll steel, phosphatized steel, coated metals such as primed steel, for example, primed by electrodeposition, spraying or dipping or previously painted metal substrates. The composition after curing provides a layer that is electrically conductive but does not have a dark color since carbon black pigment or iron oxide pigment is not used to make the composition conductive. It is possible to have a composition that is transparent, the same color as the topcoat or of a light color that is easily hidden by the topcoat at a conventional film thickness. The topcoat may be a pigmented monocoat, a clearcoat or a basecoat/clear coat. The topcoat can be applied by electrostatically spraying a base color coat/clearcoat if solvent based or if powder.

The coating composition contains an electrically conductive pigment in a pigment to binder weight ratio of about 15:100 to 100:100. Preferably, the pigment is used in a pigment to binder ratio of 30:100 to 70:100. The pigmented coating has a surface conductivity of at least 100 Ransburg Units and preferably, about 125 Ransburg Units. Surface conductivity of the coating composition is measured by a Sprayability Meter manufactured by Ransburg Electrocoating Corporation, Indianapolis, Ind.

The electrically conductive pigment has an exterior that is a two-dimensional network of crystallites of antimony-containing tin oxide which exists in a unique association with amorphous silica or a silica-containing material. The antimony-containing tin oxide forms a two-dimensional network of densely packed crystallites on the surface of the silica, silica-containing material or silica coated inorganic particles. The silica or silica-containing material is a substrate, and the network comprises a generally uniform layer of crystallites in which the crystallites form an electrically conducting pathway to adjacent crystallites. The layer of tin oxide crystallites is typically about 5 to 20 nm (nanometers) in thickness but covers the surface of a particle with major dimensions that are typically ten to ten thousand times as large as the thickness of the tin oxide layer. The crystallites are, thus, part of a continuous conducting layer in two-dimensions.

The silica substrates can be practically any shape. In the form of hollow shells, satisfactory results may be achieved when the two-dimensional network is formed on only one side of the silica substrate. In general, however, best results are obtained when practically all of the exposed surface of the silica substrate is coated with the crystallite layer.

The silica containing material of the silica substrate can be a metal silicate, silica containing glass, silica coated inorganic particle or a material having an extensive co-valent network of $SiO_4$ units.

The pigment is a powder comprising shaped particles of amorphous silica which are coated with a two-dimensional network of antimony-containing tin oxide [$SnO_2(Sb)$] crystallites. The finished particles, typically, are tens of microns to sub-micron in size, and they, in turn, are capable of forming an electroconductive network within the matrix of a thin paint film. The shaped particles of amorphous silica may be in the form of needles, platelets, spheres, dendritic structures or irregular particles. These provide an extended surface for the deposition of the antimony-containing tin oxide.

In one preferred pigment, the amorphous silica powder comprises thin shells or platelets less than about 20 nm in thickness. The pigment, when dispersed in a vehicle, is generally transparent, and its presence as a component of pigment in paint has little impact on color and related properties.

A process for preparing the electrically conductive pigment comprises:

(A) providing a substrate of amorphous hydroxylated silica or active silica-containing material, (B) applying a coating layer to the substrate surface consisting essentially of hydrous oxides of antimony and tin, and (C) calcining the coated substrate at a temperature in the range of 400° to 900° C. in an oxygen-containing atmosphere.

The coating layer of hydrous oxides of antimony and tin is applied to the hydroxylated substrate surface by adding aqueous solutions of hydrolyzable Sn and Sb salts to a slurry containing the silica at a pH in the range of about 1.5 to about 3.5, preferably at a pH of 2.0. Calcining the coated silica substrate perfects the crystalline phase of the $SnO_2(Sb)$ coating layer which imparts the desired electroconductive properties to the individual particles of the composition.

According to one aspect of the process for making the pigment, the substrate of amorphous hydroxylated silica or active silica-containing material is prepared by coating a finely divided solid core material with active silica and then removing the core material without unduly disturbing the silica coating. The substrate thus produced comprises hollow silica particles which are substantially translucent and which have the general shape of the original core material. The silica coating should be sufficiently thin, for this purpose, so as not to reflect light. This will normally mean a thickness of less than about 250 nm. For most applications, thickness in the range of about 5 to 20 nm are preferred.

Active silica is conveniently prepared by gradually neutralizing an aqueous solution of sodium silicate or potassium silicate with a mineral acid, such as, for example, sulfuric acid or hydrochloric acid.

Active silica-containing materials may conveniently be applied as coatings for a selected core material by including other components along with the active silica in the reacting solution. For example, by adding sodium borate along with the sodium or potassium silicate, a silica-boria coating may be obtained. Such coatings are effective as a substrate so long as the surface of the coating contains hydroxylated silica functionalities. If the other component or components present in the silica-containing substrate inhibit the retention of hydroxyl groups on the substrate surface, then the subsequent $SnO_2(Sb)$ coating may not adhere completely and may, thus be less effective.

The conductive pigment in addition to providing electrical conductivity to the coating provides unexpected and desirable enhancements to the film properties of the cured coating in particular to those coatings that are applied to plastic or reinforced plastic substrates. In both rigid and flexible cured finishes of the coating composition, the conductive pigment produces a decrease in the glass transition temperature of the cured finish that enhances its toughness and solvent resistance when compared to cured finishes having an equal amount of non-conductive pigment or to an unpigment clear finish.

The coating composition contains about 40-75% by weight of film forming binder and a liquid for the binder and pigment and other additives. The carrier is usually a solvent for the binder but may be aqueous or a blend of solvent and non-solvent for the binder. The binder preferably contains about 40-70% by weight of the multifunctional amine, polyamide or polyamido amine resin and correspondingly about 30-60% by weight of the epoxy resin.

Compositions formed from the preferred binder forms a cured coating on plastic substrates that is hard but flexible. A plastic substrate coated with such a cured coating can be bent 180 around a 3 ⅛ inch mandrel with the coating facing outward and tested at $-29°$ C. and the coating has a surface conductivity of at least 125 Ransburg units.

Multifunctional amines useful in this composition are aliphatic or aromatic polyamines; such as ethylene diamine, diethylene triamine, triethylene tetramine, tetraethylenepentamine methyliminobispropylamine, phenylenediamine, 4,4 -methylenedianitine and 2,4-tolylene diamine.

The polyamido amine resin used in the coating composition is the condensation product of a monobasic acid and a multifunctional amine. The monobasic acids used are unsaturated fatty acids, preferably. tall oil fatty acids. The preferred amine is tetraethylenepentamine. Any of the aforementioned amines also can be used.

Preferably, polyamide resins are used. These resins are the reaction product of polymeric fatty acids and polyalkylene polyamines. Illustrative of such polyalkylene polyamines are ethylene diamine, diethylene triamine and triethylene tetramine. These polyamides have a high amine number, preferably in the range of 50 to 400.

The polymeric fatty acids employed in the preparation of the polyamide resins can be prepared by thermal polymerization of unsaturated fatty acids, for example, linoleic acid, linolenic acid, oleic acid, stearic acid and the like. These polyamides are available under the tradename "Versamid" manufactured by Henkel Corporation.

"Versamid" resins are relatively low-melting, highly soluble polyamide resins of low to moderate molecular weight. "Versamid" 115 and 253 are preferred to form a high quality primer. These polyamide resins are the condensation product of dimer acids and a mixture of alklene polyamines. Dimer acids are the dimerization product of unsaturated fatty acids.

The polyamide resin has an amine value of 210-246 and an amino hydrogen equivalent weight of 132-200. Varying the acid and/or the functionality of the polyamide resin can vary the levels of active amino groups spaced along the resin molecule. On curing of the coating composition the amino groups of the multifunctional amine or the polyamide resin react with the epoxide groups of the epoxy resin to form a cross-linked finish.

The epoxy resin used in this composition contains terminal epoxide groups which react with the amino groups in the following manner:

The primary amine group of the multifunctional amine, polyamide resin or polyamido amine resin reacts with the epoxide group to provide secondary amine groups, which further react with another epoxide group to generate a tertiary amine group. The hydroxyl groups formed in both reactions are believed to catalyze the amine-epoxide reactions. The tertiary amine group also provides a catalytic effect and causes the epoxide groups of the epoxy resin to self-polymerize to form a polyether.

The epoxy resins used in the primer composition are well known and are prepared by known techniques. They are compounds or mixtures of compounds containing at least one, but typically more than one, 1,2-epoxy group of the formula

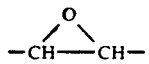

These epoxy resins may be saturated or unsaturated, aliphatic, cycloaliphatic, aromatic or heterocyclic. Examples of suitable epoxy resins include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include
1,1-bis(4-hydroxyphenyl)ethane;
2,2-bis(4-hydroxyphenyl)propane;
1,1-bis(4-hydroxyphenyl)isobutane;
2,2-bis(4-hydroxytertiarybutylphenyl)propane;
bis(2-hydroxy-1,5-dihydroxynaphthalene;
1,1-bis(4-hydroxy-3-allyphenyl)ethane; and
hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol. Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2-hexanetriol, pentaerythritol, and 2,2-bis(4-hydroxycyclohexyl) propane.

Epoxy resins additionally include polyglycidyl esters of polycarboxylic acids such as the generally known polyglycidyl esters of adipic acid, phthalic acid, and the like. In addition, polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate. Many additional examples of epoxy resins are described in the *Handbook of Epoxy Resins*, Henry Lee and Kris Neville, 1967, McGraw Hill Book Company.

Any of the conventional solvents or blends of solvents can be used to form the above composition provided that the selection of solvents is such that the polymeric constituents are compatible and give a high quality primer or primer surfacer. The following are examples of solvents which can be used to prepare the composition: methylethyl ketone, methylamyl ketone, methyl isobutyl ketone, toluene, acetone, xylene, isopropanol, ethylene glycol monoethyl ether acetate, and other esters, ethers, ketones, and aliphatic, cycloaliphatic and aromatic hydrocarbon solvents.

In addition to the above described electrically conductive silica pigment, variety of pigments, organic dyes and lakes can be utilized in the compositions of this invention. Examples of the useful pigments are: metallic oxides, such as titanium dioxide, iron oxide, zinc oxide and the like; metal hydroxides, metal powders, sulfides, sulfates, carbonates, silicates such as aluminum silicate, talc, china clay, barytes, iron blues, lead blues, organic reds and organic maroons and the like.

Pigments can be introduced into the compositions of the invention by first forming a mill base. The mill base can be formed, for example, by conventional sand-grinding or other media milling techniques, and then can be blended, by simple stirring or agitation, with the other constituents of the coating composition.

In addition to the essential components described above, compositions within the scope of the present invention can also include flow control agents, drying oils, and fillers. Flow control agents, for example, include polymers such as polyalkyl acrylates and methacrylates (e.g. Resiflow ® L, available from the SBS Chemical Company), fluorinated polymers such as fluorinated esters of polyethylene glycol or polypropylene glycol, methyl phenyl polysiloxanes, or mixtures of silica and polyvinylpyrrolidone.

The composition can contain about 0.01-2% by weight, based on the weight of the binder, of ultraviolet light stabilizers which term includes ultraviolet light absorbers, screener and quenchers. Typical ultraviolet light stabilizers include benzophenones, triazines, triazols, benzoates, hindered amines and blends of thereof.

The compositions can be applied to a substrate by conventional techniques such as spraying, electrostatic spraying, dipping, brushing, flowcoating and the like. The preferred method is spraying. After application, the composition is baked at about 75°-200° C. for about 5-45 minutes to form a coating layer about 0.1-2.0 mils thick. Low temperature curing for some compositions can be used such as 80°-125° C. for about 15-45 minutes. Generally, the primer layer is about 0.5-1.5 mils thick. Primer surfacer layer or guide coat is about 0.5-2.0 mils thick. Conventional solvent borne or water borne acrylic enamels or lacquers, acrylic polyurethane coatings, polyesterurethane coatings, alkyd enamels and the like can be applied efficiently by electrostatic spraying and then baked to form a durable automotive or truck finish on the substrate. Clear coat/base coat finishes of the above coating can also be applied.

The composition of this invention can be used in a process for finishing the exterior surfaces of automotive or truck components. The components can be parts or assemblies of primed steel primed with conventional primer or an electrodeposition primer, in-mold primed sheet molding compound, thermoplastic polyolefin with a sealer coat, polyethylene terephthlate, polyethylene glycol terephthlate and the like. The composition is applied by conventional spraying techniques to the component and cured at about 80°-125° C. for about 15-45 minutes. A low bake enamel basecoat/clear coat is applied and the resulting component is cured at the above temperature and time. The basecoat/clear coat can be an acrylic melamine, polyester/melamine, epoxy resin/anhydride crosslinking component, polyacrylourethane or a silane acrylic polymer.

The following examples illustrate the invention. All parts and percentages are on a weight basis unless indicated otherwise.

EXAMPLE 1

A conductive polyamide translucent millbase was prepared as follows:

| | Parts by Weight |
|---|---|
| Polyamide resin | 1000 |
| (Versamid-253 from Henkel Corp. describe above in the specification) | |
| Ethylene glycol mono-butyl ether | 100 |
| Diethylene glycol mono-butyl ether | 1300 |
| Conductive pigment [pigment particles of hollow shells of silica with fine crystallites of antimony-doped tin oxide forming a uniform, two-dimensional network on the surface of the silica containing 46% Sn(as SnO$_2$), 22% Si (as SiO$_2$), 18% Ba (as BaO), and 4% Sb (as Sb$_2$O$_3$)] | 2400 |
| TOTAL | 4800 |

The above constituents were mixed together for about 30 minutes and then charged into a conventional sand mill and ground two passes to provide a millbase having a pigment to binder ratio of about 343/100.

A light blue flexible coating composition was prepared by mixing together the following constituents:

| | Parts by Weight |
|---|---|
| Conductive millbase (prepared above) | 109.50 |
| Polyamide resin (described above) | 30.00 |
| Epoxy Resin (cycloaliphatic glycidyl ester-Ciba-Geigy Corp. - CY-184) | 40.00 |
| Titanium dioxide tint - (P/B - 275/100 TiO$_2$ millbase ground in an acrylic dispersion resin - 72.69% wt. solids - Ti-Pure R - 960 titanium dioxide from E. I. Du Pont Corp.) | 31.70 |
| Phthalocyanine Blue toner tint - (P/B - 33/100 Monarch Blue x -3374 pigment from Ciba-Geigy Corp. ground in an acrylic dispersion resin - 42.8% wt. solids) | 2.60 |
| TOTAL | 213.80 |

The above constituents were added in the order shown and mixed for about 15 minutes. The resulting guide coating composition has a pigment to binder ratio of about 85/100 of conductive pigment and 17/100 of colored pigment. The light blue conductive primer was reduced to about 30 seconds in a #2 Fisher cup with methylethyl ketone.

The composition was sprayed onto the following panels: an unprimed cold roll steel panel, an electrocoated epoxyester primed steel panel, phosphatized steel panel, a fiber glass reinforced polyester panel, a reaction injection molded urethane panel and a partially crystalline polyamide panel. The steel panels were baked for about 30 minutes at about 100° C. The resulting primer finish had a light blue color and was about 1.0-2.0 mils thick. The non-metal panels were baked at about 100° C. for about 25 minutes. The resulting finish had a light blue color and was about 1.0-2.0 mils thick.

Each of the primer finishes had a conductivity of about 160 Ransburg units.

A conventional light blue thermosetting acrylic enamel was electrostatically applied to each of the above prepared coated panels. The transfer efficiency of the enamel was excellent as could be expected for a conductive substrate and the enamel had excellent adhesion to the guide coat and had an automotive level of gloss and distinctness of image. Topcoat film builds of 10-25% thinner could be applied without affecting the resulting topcoat color when compared with traditional black conductive coatings.

Each of the coated panels passed all of the standard automotive property tests.

EXAMPLE 2

A conductive polyamide white millbase was prepared as follows:

| | Parts by Weight |
|---|---|
| Polyamide resin (described in Example 1) | 1000 |
| Diethylene glycol mono-butyl ether | 1300 |
| Conductive pigment (titanium dioxide pigment particles coated with a thin layer of silica which in turn was coated with fine crystallites of antimony-doped tin oxide forming a uniform, two dimensional network on the surface - the pigment having the following analysis 33.8% SnO$_2$, 1.6% SiO$_2$, 4.3% Sb$_2$O$_3$, 58.0% TiO$_2$ and 2.3% other) | 2400 |
| TOTAL | 4700 |

The above constituents were mixed together for about 30 minutes and then charged into a conventional sand mill and ground two passes to provide a millbase having a pigment to binder ratio of about 343/100.

An off-white conductive rigid coating compositions was prepared by mixing the following constituents:

| | Parts by Weight |
|---|---|
| Conductive millbase (prepared above) | 95.6 |
| Polyamide resin (described in Example 1) | 25.0 |
| Epoxy Resin (75% solution of aromatic epoxy Epon 1001F from Shell Chemical Corp. in equal parts of n-butanol and toluene) | 46.7 |
| TOTAL | 167.3 |

The above constituents were added in the order shown and mixed for about 15 minutes. The resulting off-white conductive guide coating composition has a pigment to binder ratio of about 64/100. The primer was reduced to about 30 seconds in a #2 Fisher cup with methylethyl ketone and sprayed onto the following panels: a cold roll steel panel, a phosphatized steel panel, an electrocoated primed epoxy ester steel panel and an assortment of rigid (flex. modulus greater than about 250,000 psi) automotive plastics panels. They were baked about 30 minutes at about 100° C. The resulting film thickness was about 1.0-2.0 mils and the films had a conductivity of about 125 Ransburg units.

A conventional white automotive thermosetting acrylic enamel was electrostatically applied to each of the above prepared coated panels. The transfer efficiency was excellent and was equivalent to that obtained on bare metal panels. A topcoat film having 10-20% lower film build than conventionally used was applied and did not affect the topcoat color. A panel coated with a conventional black conductive coatings required a higher film build to achieve the same level of color.

Each of the coated panels had automotive level of gloss and distinctness of image and passed all of the standard automotive property tests.

What is claimed is:

1. A process for finishing the exterior surface of an automobile component to form a multilayer composition which comprises
   (1) applying a conductive coating composition to the exterior surface of the component;
   (2) curing the coating at a temperature of about 80°-125° C. for about 15-45 minutes.
   (3) applying a pigmented liquid enamel basecoat and over the basecoat applying an enamel liquid clear coat and curing both coats at a temperature of about 80°-125° C. to provide basecoat/clearcoat finish on said component;

wherein the conductive coating composition comprises a film forming binder in an organic liquid carrier and pigment in a pigment to binder weight ratio of about 15:100 to 100:100; wherein the binder consists essentially of
   (A) 40-70% by weight of an amine component having at least two reactive amine groups selected from the group consisting of an amine, polyamide, polyamido amine resin or mixtures thereof; and
   (B) 30-60% by weight of an epoxy resin having at least two epoxy groups per resin molecule;

wherein the pigment comprises an electrically conductive pigment that comprises silica selected from the group consisting of amorphous silica, a silica containing material or silica coated pigment, said silica being in association with a two-dimensional network of antimony-containing tin oxide crystallites in which the antimony content ranges from about 1-30% by weight of the tin oxide and the composition forms a coating having a surface conductivity of at least 100 Randsburg units.

2. The process of claim 1 in which the component is a primed metal.

3. The process of claim 1 in which the component is a plastic of an in-mold primed sheet molding compound, sealed thermoplastic polyolefin, polyethylene terephthalate, polyethylene glycol terephthalate.

4. The process of claim 1, in which the basecoat/clearcoat is selected from the group consisting of an acrylic polymer crosslinked with melamine resin, a polyester crosslinked with melamine resin, an epoxy resin reacted with an anhydride, an acrylic polymer crosslinked with an isocyanate or a silane acrylic polymer.

5. A substrate coated by the process of claim 1.

6. The process of claim 1 in which the conductive pigment comprises an inert core material having a coating selected from the group consisting of an amorphous silica coating or a silica-containing coating which is surface coated with a two-dimensional conducting network of antimony-containing tin oxide crystallites.

7. The process of claim 1 in which the conductive pigment comprises an amorphous silica or silica containing material surface coated with a two-dimensional conducting network of antimony-containing tin oxide crystallites.

8. The process of claim 1 in which the conductive pigment consists of hollow shells of amorphous silica or silica containing material surface coated with a two-dimensional conducting network of antimony-containing tin oxide crystallites.

9. The process of claims 1, 6, 7 or 8 in which the silica-containing material is a composition selected from the group consisting of metal silicates, silica-containing glass, and material having a network of $SiO_4$ units.

10. The process of claim 9 in which the silica-containing material is a silica-boria material.

11. The process of claim 6 in which the inert core material is titanium dioxide.

12. The process of claim 1 in which the film forming binder consists essentially of about
   (A) 40-70% by weight of a polyamide resin having reactive amine hydrogen atoms and an amine no. of about 50-400 and is the reaction product of polymeric fatty acids and polyalkylene polyamine; and
   (B) 30-60% by weight of a cycloaliphatic polyglycidyl ester having two or more epoxy groups per molecule.

13. The process of claim 12 wherein the composition forms a hard electrically conductive flexible finish on a plastic substrate wherein the coated plastic substrate can be bent 180° around a 3⅛ inch mandrel with the coating facing outward −29° C. and the coating has a surface conductivity of at least 125 Ransburg units.

14. The process of claim 12 in which the composition contains color pigments wherein the coating color is substantially similar to the color of a topcoat that is later applied.

15. The process of claim 1 in which the film forming binder consists essentially of about:
   (A) 40-70% by weight of a polyamide resin having reactive amine hydrogen atoms and an amine no. of about 50-400 and is the reaction product of polymeric fatty acids and polyalkylene polyamide; and
   (B) 30-60% by weight of an aromatic epoxy resin of bisphenol A or bisphenol F and epichlorohydrin and the resin having essentially two epoxy groups per molecule.

* * * * *